No. 817,944. PATENTED APR. 17, 1906.
T. WILCOX.
LOCKET, PHOTOGRAPH PENDANT, FRAME, CHARM, AND THE LIKE.
APPLICATION FILED AUG. 26, 1904.

2 SHEETS—SHEET 1.

WITNESSES
F. A. Stewart
C. E. Mulreany

INVENTOR
Thomas Wilcox
BY Edgar Tate & Co.
Attorneys

No. 817,944. PATENTED APR. 17, 1906.
T. WILCOX.
LOCKET, PHOTOGRAPH PENDANT, FRAME, CHARM, AND THE LIKE.
APPLICATION FILED AUG. 26, 1904.
2 SHEETS—SHEET 2.
*Fig. 8.*
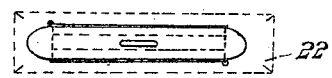
*Fig. 9.*
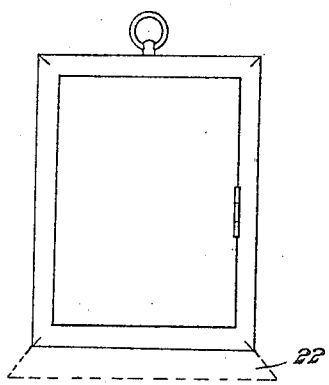
*Fig. 10.*
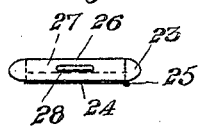
*Fig. 11.*
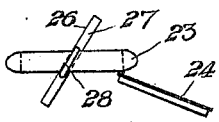
*Fig. 12.*
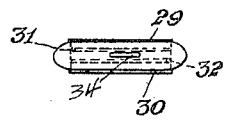
*Fig. 13.*
*Fig. 14.*
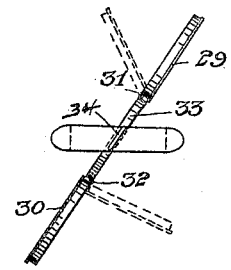
*Fig. 15.*
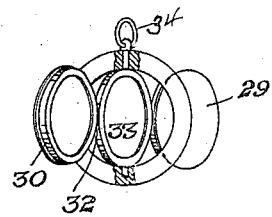
WITNESSES
F. A. Stewart.
C. E. Mulreany
INVENTOR
Thomas Wilcox
BY Edgar Tate & Co.
Attorneys.

ance.

UNITED STATES PATENT OFFICE.

THOMAS WILCOX, OF BIRMINGHAM, ENGLAND.

LOCKET, PHOTOGRAPH-PENDANT, FRAME, CHARM, AND THE LIKE.

No. 817,944.

Specification of Letters Patent.

Patented April 17, 1906.

Application filed August 26, 1904. Serial No. 222,205.

*To all whom it may concern:*

Be it known that I, THOMAS WILCOX, a subject of His Majesty the King of Great Britain, residing at 111 Spencer street, Birmingham, in the county of Warwick, England, have invented certain new and useful Improvements in and Relating to Lockets, Photograph-Pendants, Frames, Charms, and the Like, of which the following is a specification, such as will enable those skilled in the art to which it appertains to make and use the same.

The herein-described invention relates to improvements in lockets, photo-pendants, frames, charms, and the like, whereby the contents are readily exposed to view.

Figure 1:
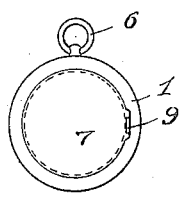
Figure 6:
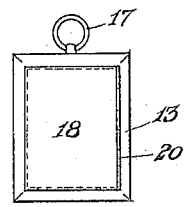
Figure 2:
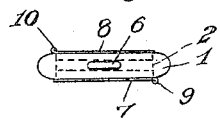
Figure 3:
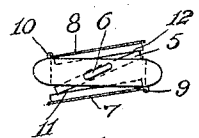
Figure 7:
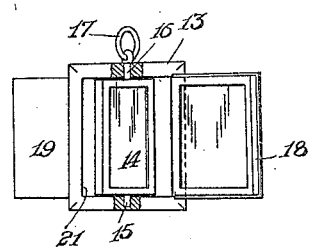
Figure 4:
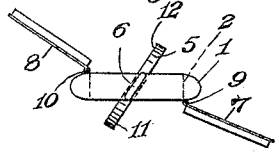
Figure 5:
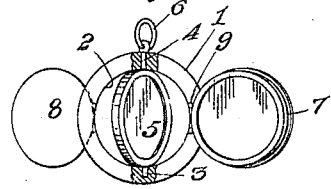

In referring to the accompanying drawings, Figure 1 shows a front view of a locket or pendant constructed according to this invention for holding and exposing to view photos, hair, mirrors, compasses, or other articles. Fig. 2 is a plan of the same. Fig. 3 is also a plan of the locket in the act of being opened. Fig. 4 shows the same opened. Fig. 5 is a front view of the locket or pendant opened. Fig. 6 shows a front view of an oblong locket or pendant closed. Fig. 7 shows a front view of the same opened. Fig. 8 shows a plan of a locket or pendant, on a larger scale, for chatelaines or the like or as a photo-frame. Fig. 9 is a front view of the same. Figs. 10 and 11 show another way in which this invention may be carried out in closed and opened positions. Fig. 12 shows in plan a still further form closed. Fig. 13 shows the same open. Fig. 14 shows a front view of Fig. 13, and Figs. 15, 16, and 17 show a still further way in which this invention may be carried into effect.

In describing this invention in reference to Figs. 1 to 5 I construct a frame or bezel 1 with a flat inner surface 2 from front to back, and to the center of the frame 1 in a vertical position I pivot at 3 4 an inner bezel 5 of a size to permit of its being revolved or turned within the frame 1, when the locket or pendant is required to be opened, by means of a ring 6, fixed to the pivot 4 on the outside of the frame 1. Instead of the ring 6 being fixed it may be made to turn down, or the bezel 5 may be turned by a button, like a keyless watch, or in any other suitable manner. On the surface at the front and back of the frame 1 I construct two lids 7 8, these lids being hinged at 9 10 to the frame 1 in opposite positions to each other, so that when the bezel 5 is turned by the ring 6 the edges 11 12 of the bezel 5 bear against the inner parts of the lids 7 8 and turn the same outwardly from the closed position (shown in Figs. 1 and 2) into the position shown by Fig. 3, and then, as shown by Figs. 4 and 5, to expose to view the photo or other contents.

Instead of the lids 7 8 being solid, with a photo, for instance, inside the same, they may be arranged with a glass front, so that a photo may be exposed to view when closed, or a mirror or any other article may be inserted in the lids or inner bezel instead of photographs.

In referring to Figs. 6 and 7 the locket or pendant is shown formed with a frame 13, oblong in shape and arranged with a similar-shaped inner bezel 14, having pivots 15 16, the same being turned by a ring 17, which is fixed to the pivot 16, the lids 18 19 being hinged or jointed at 20 21 and opened to expose the photos, mirrors, or the like to view by turning the bezel 14 through the ring 17, similarly as described in reference to Figs. 1 and 5.

In referring to Figs. 8 and 9 this invention is shown a larger size, applicable to ladies' chatelaines and like purposes, and is formed similarly as described in reference to Figs. 6 and 7. If desired, the same may have a support 22 (shown by dotted lines) to act as a photo-frame, or instead of the supports legs or other ornamental carriers may be arranged.

In referring to Figs. 10 and 11 the locket or pendant is formed with a frame 23, having a lid 24, hinged at 25, the side 26 of the revolving or turning bezel 27 forming the other lid when the locket is closed, (see Fig. 10,) the bezel 27 opening the lid 24 when turned by the ring 28 into the position shown by Fig. 11 for exposing the contents to view.

In referring to Figs. 12, 13, and 14 instead of hinging the lids to the surface I hinge the lids 29 30 at 31 32 to the revolving or turning bezel 33, the lids being capable of being moved into the position shown by full and dotted lines in Fig. 13 or into any other position by means of the ring 34.

Figures 16, 17:
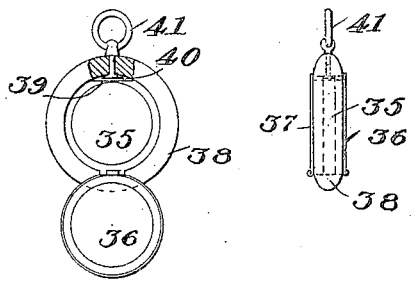

In referring to Figs. 15, 16, and 17 instead of the inner bezel revolving, the bezel 35 is fixed, the lids 36 37, which are hinged to the outer frame 38 at the bottom, so that as the points 39 40 bear against the inside of the lids 36 37 as the ring 41 is turned the lids 36 37 falling downwardly expose to view the photos or other contents. (See Fig. 17.)

It is to be understood that the lid or lids may be hinged in any other position to that described, the inner bezel being then turned practically in the opposite direction to that shown.

What I claim as my invention, and desire to secure by Letters Patent, is—

1. A device of the class described, comprising a frame, a bezel pivoted therein and adapted to turn therein, side members hinged to said frame and opened when closed by the turning of said bezel, and means for turning said bezel, substantially as shown and described.

2. A device of the class described, comprising a frame, a bezel pivoted therein, means for turning said bezel in said frame, and members hinged to the frame and opened by the turning of said bezel, substantially as shown and described.

3. A device of the class described, comprising a frame, swinging members hinged to the opposite sides thereof and adapted to be opened and closed, a bezel pivoted in said frame and the turning of which opens said members, and means for turning said bezel, substantially as shown and described.

4. A device of the class described, comprising a frame, a bezel pivoted therein by means of pivot-pins one of which passes through said frame, members hinged to said frame and adapted to be open and closed, said members being opened by the turning of said bezel, and means for turning said bezel in said frame consisting of a ring or head connected with the pivot-pin which passes through the frame, substantially as shown and described In testimony that I claim the foregoing as my invention I have signed my name, in presence of the subscribing witnesses, this 20th day of July, 1904.

THOMAS WILCOX.

Witnesses:
   HERBERT WHITEHOUSE,
   REBECCA WALSHAM